June 19, 1956
J. G. COHN
2,751,281
APPARATUS FOR THE CONTINUOUS ANALYSIS
OF CONTAMINANTS IN GASES
Filed Feb. 19, 1953
2 Sheets-Sheet 1
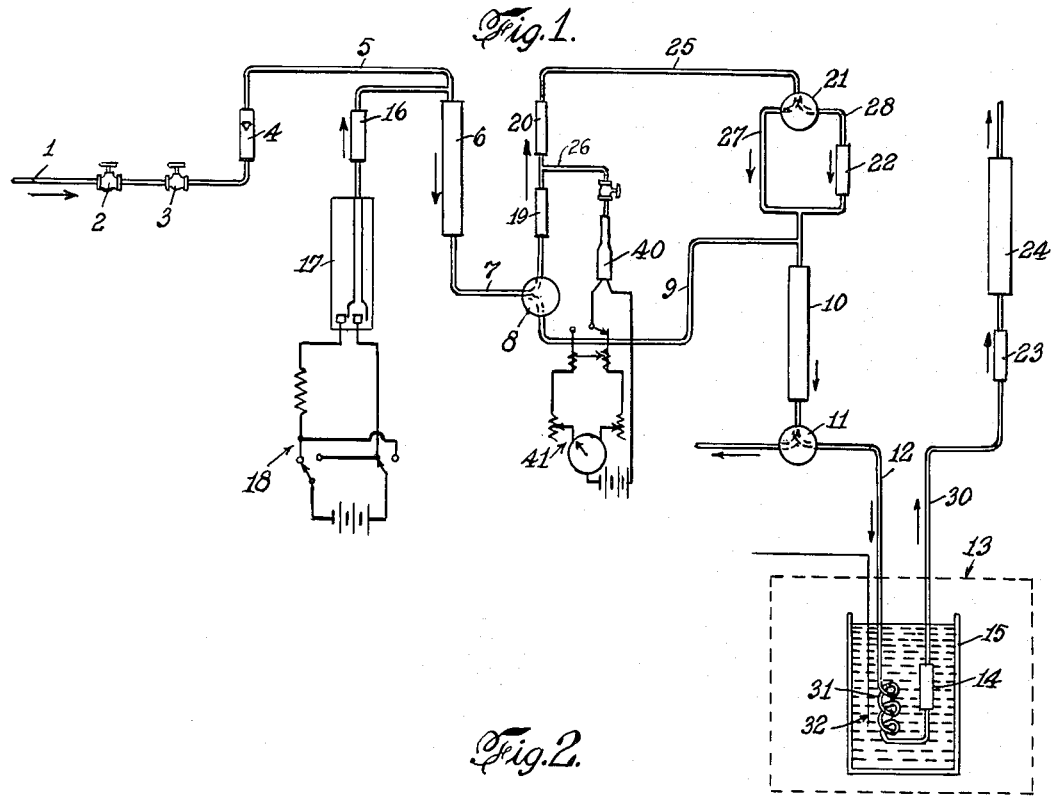
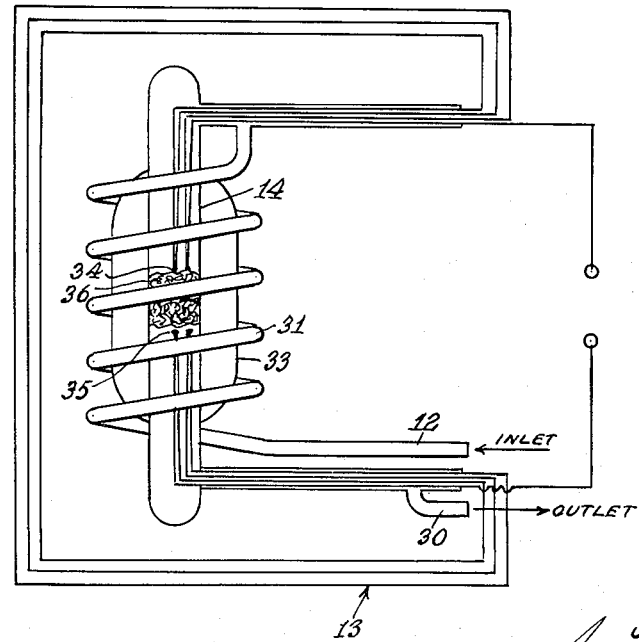
INVENTOR.
JOHAN G. COHN
BY
ATTORNEY.

June 19, 1956 J. G. COHN 2,751,281
APPARATUS FOR THE CONTINUOUS ANALYSIS
OF CONTAMINANTS IN GASES
Filed Feb. 19, 1953
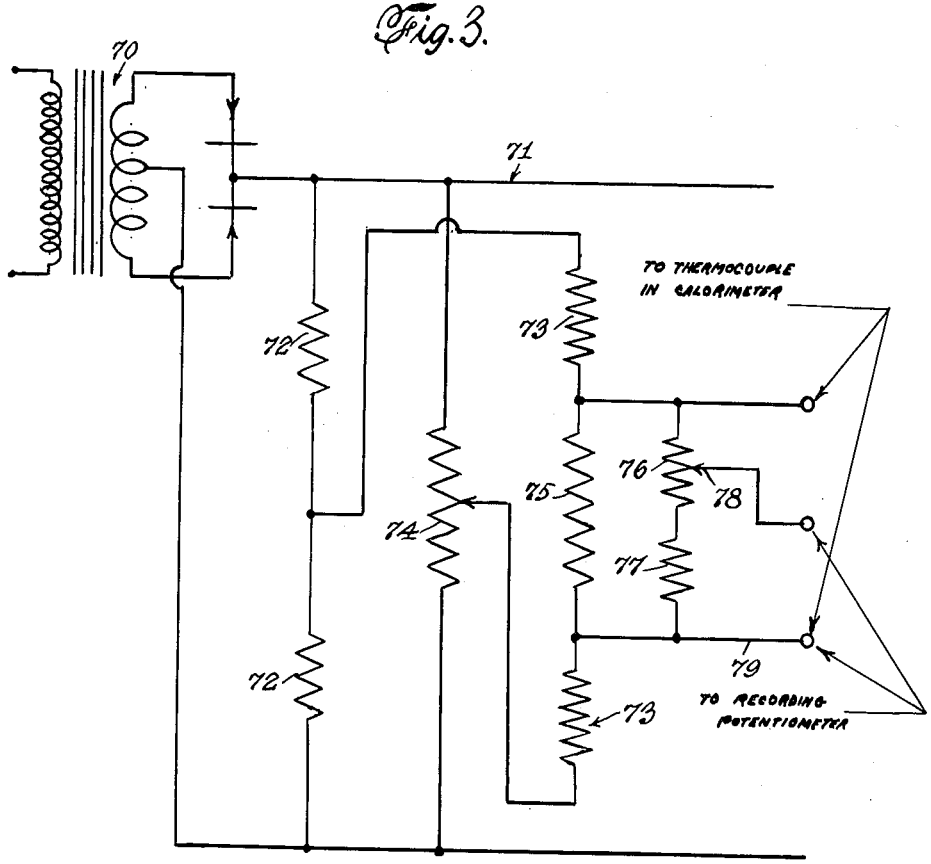
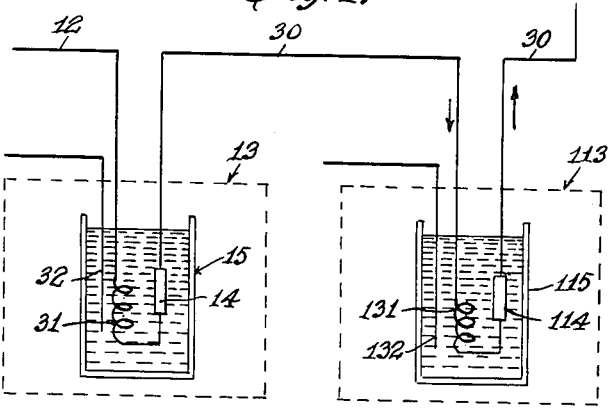
INVENTOR.
JOHAN G. COHN
BY
ATTORNEY.

United States Patent Office 2,751,281
Patented June 19, 1956

2,751,281

APPARATUS FOR THE CONTINUOUS ANALYSIS OF CONTAMINANTS IN GASES

Johan Gunther Cohn, West Orange, N. J., assignor to Baker & Company, Inc., Newark, N. J., a corporation of New Jersey Application February 19, 1953, Serial No. 337,858

5 Claims. (Cl. 23—255)

The present invention deals with an apparatus for the continuous assaying and recording of low concentrations of contaminants in gases and particularly with an apparatus for indicating low concentrations of contaminants present in a flowing gaseous reaction mixture.

The concentration of a constituent of a flowing gaseous mixture may be continuously assayed and recorded by measuring the heat liberated in a suitable catalytic reaction in which the constituent to be determined participates. The concentration of such a constituent is proportional to the amount of heat generated by the catalytic reaction. Concentrations greater than a few tenths of one percent are usually determined by passing the gaseous reaction mixture containing the unknown concentration of a constituent over a heated filament of catalyst wire, preferably a platinum metal wire, which is an arm of a bridge circuit, whereby the increase in resistance of the bridge arm due to the heat liberated by the reaction is determined. A good example of such an application is the determination of combustibles in flue gases or air.

For the determination of small amounts, or low concentrations, of a constituent in the range of about 0.001% to 0.1%, carrier supported catalysts are preferred and the heat developed by the gas reaction is measured with thermistors or thermocouples such as set forth in my co-pending application Serial No. 728,676 filed February 14, 1947, now Patent No. 2,631,925, issued on March 17, 1953, wherein this type of measurement is applied in the determination of small quantities of oxygen or hydrogen impurities in a gaseous medium by passing the gases over a supported palladium catalyst.

However, in the determination of constituent concentrations in a gaseous reaction mixture wherein the said concentrations are comparatively minute, e. g. of the order of 0.0001% to 0.001% concentration existing types of apparatus including my previously described device are not satisfactory nor sufficiently sensitive. In such case, the heat of reaction or temperature increment is of the order of a few hundredths of one degree centigrade. For instance, a concentration of 0.0002% oxygen in hydrogen or nitrogen develops upon catalytic combination with hydrogen a theoretical increment of 0.033° C., and actually only about 80% of this value will be established in a flow calorimeter and will thus be available for measurement. Therefore, in view of the aforesaid small temperature increment resulting from the minute concentration accurate determination of the constituent concentration cannot be ascertained by presently available commercially practical apparatus, since such apparatus do not adequately provide for certain temperature increment influencing conditions and means whereby such conditions may be controlled. It is, for certain applications, extremely desirable that the aforesaid low concentrations be detected and measured in flowing gases. For example, traces of oxygen in sintering atmospheres have frequently remained undetected with substantial losses resulting from large batches of spoiled product, or minute quantities of oxygen in the atmosphere of heat treating and welding furnaces may result in impaired quality, especially when working with stainless and other alloy steels, or oxygen impurity in gases used for filling vacuum tubes and lamps may incur costly spoilage. These and many other instances have stimulated both users and manufacturers of industrial gases to seek a practical and suitable method and apparatus for detecting and measuring traces of oxygen, or traces of other gas impurities existing in a commercial gas in the above mentioned extremely low concentration range of 0.0001% to 0.001%.

It is an object of the present invention to provide an apparatus or instrument for the continuous determination of low concentrations of constituents of a flowing gaseous reaction mixture. It is another object of the present invention to provide an instrument of high sensitivity for determining and recording low concentrations of constituents of a flowing gaseous reaction mixture which shall use the principle of catalytic combination of oxygen and hydrogen. It is a further object of the present invention to provide an instrument referred to in the above objects which is characterized by the capabilities of determining the concentration of several gas constituents practically simultaneously. It is a still further object of the present invention to provide an instrument for the continuous determination in a flowing gaseous reaction mixture of concentrations of gaseous constituents, particularly in the range of from about 0.0001% to about 0.001% concentration which shall be reliable and accurate in its performance over extended periods of time. Other objects of the present invention will become apparent from the description hereinafter following and the drawing forming part hereof in which:

Figure 1 represents a schematic diagram of the instrument of the present invention, Figure 2 illustrates an enlarged view of a portion of the present invention, Figure 3 illustrates an electrical system comprising a portion of the electrical network of the present invention, and Figure 4 is a schematic view of a portion of the apparatus embodying a modification thereof.

The present invention deals with an apparatus or instrument for the continuous detection, determination, measurement and recording of traces or low concentrations of gas constituents, especially of the order of 0.0001% to 0.001% concentration, of a flowing gaseous medium. The instrument incorporates in combination with a continuous conduit system a catalyst-containing flow calorimeter structure capable of greatly minimizing the effect of ambient temperatures, means for measuring low values of the heat of reaction in said calorimeter structure, means for adjusting for variations in the efficiency of the calorimeter catalyst, and means for calibrating and recalibrating the response of said catalyst; whereby the said instrument is rendered capable of continuously detecting and measuring such low gas constituent concentrations as would otherwise either remain undetected or could not be accurately measured by present commercial instruments of this type. This instrument utilizes the exothermic catalytic combination of oxygen and hydrogen in one aspect of the invention.

Figure 1 illustrates a schematic flow diagram of the present invention wherein a gaseous medium, containing as a constituent thereof an unknown concentration of a gas, to be determined, e. g. an oxygen impurity, enters an inlet conduit 1 of the instrument and passes through pressure regulating valves 2 and 3. The dual assembly of pressure valves serves to assure a uniform rate of flow of the gaseous medium into and through the instrument. A dual assembly of such valves as shown is preferred to a single regulating valve since, while the first valve eliminates the largest part of pressure fluctuations, there is normally left a minimum pressure fluctuation which the second valve is designed to eliminate. Regularized flow at constant pressure thus prevails during the passage of the gas through the rotameter 4 to measure the volumetric rate of flow of the gaseous medium. If the gaseous medium comprises an amount of hydrogen sufficient to eliminate an oxygen impurity, the normal flow of the gaseous medium passes through conduit 5 directly through purifier 6, containing, for instance, activated charcoal to purify the gas from such matter as organic impurities which might tend to poison the catalysts over which the gases subsequently pass. The gases then pass outwardly of the purifier 6 by means of the conduit 7, through the two-way valve member 8 through conduit 9 to dryer 10, containing, for instance, activated alumina, silica gel, or the like, which serves to eliminate moisture carried along by the gaseous media. After passing through dryer 10 and prior to the calorimeter 13 is an escape valve or purge vent 11 which is in the open position when the instrument is started in operation to permit any residual gases to escape until the flowing gaseous medium has thoroughly rinsed the system from air or other entrapped gas to prevent the formation of an explosive mixture. During a measurement this valve is in the closed position to permit passage of the gas therethrough to the remainder of the instrument.

The calorimeter 13 receives the gaseous medium through conduit 12. The calorimeter contains a catalyst chamber 14 through which the gaseous medium passes and wherein the catalytic combination of the oxygen impurity with the hydrogen content substantially eliminates the oxygen impurity. Subsequently the gas is vented through a small catalyst chamber 23 and dryer 24. The catalyst in chamber 23 is the same as in the calorimeter and merely serves to prevent any traces of oxygen from the air to penetrate upstream and reach the calorimeter, by combining such traces catalytically with hydrogen.

As indicated previously, the temperature increments which must be measured when constituents of a gaseous medium are present in a concentration of between 0.0001% and 0.001%, are of the order of a few hundredths of one degree centigrade. For example, a concentration of 0.0002% oxygen in hydrogen or in nitrogen develops, upon catalytic combination with hydrogen, a theoretical temperature increment of 0.033° C. and when it is considered that only about 80% of this value (i. e. 0.0264° C.) will actually be attained in a flow calorimeter it is readily apparent that the structure taught by my prior application Serial No. 728,676, referred to above, would not be sufficiently sensitive to obtain accurate measurement.

As seen in Figure 2, in order to gain sufficient sensitivity in the calorimeter 13, I employ temperature sensing elements such as thermocouples having cold junctions 34 and hot junctions 35 located within catalyst chamber 14 on either side of a catalyst 36, operable at room temperature, e. g. carrier based palladium which in this instance removes the requirement of heating the bath surrounding the calorimeter. The sensitivity of these thermocouples can readily be increased by simply increasing the number of hot and cold junctions, and is preferably made of alloy materials so that the thermocouple units are easily commercially reproducible.

In introducing thermocouples into the catalyst chamber to measure the temperature evolved during catalytic combination, several difficulties arise which would tend to limit their use. For example, any dissimilarities in the thermocouple material or any uncontrolled fluctuations in temperature at the hot and cold junctions may result in stray E. M. F.'s or drifts of the zero point of the couple. In order to eliminate these factors I immerse the catalyst chamber 14 in a liquid bath in a Dewar vessel 15, which may be simply water or a thin mineral oil. The bath need not be rigorously thermostated, since it is only necessary that any temperature shifts occur slowly, and that the formation of temperature differences in the bath is prevented. To keep the bath at the same temperature I provide an agitator such as tube 32 through which air is continuously bubbled. As seen in Fig. 2, the gaseous medium is first passed from conduit 12 through a heat exchanger coil 31, preferably of copper, which is spaced from and coiled about the catalyst chamber 14 before being passed over the catalyst 36 in order to stabilize the gas temperature to that of the calorimeter and eliminate the effects of ambient temperature changes. As an additional feature the chamber 14 is vacuum jacketed as at 33 to stabilize and insulate the temperature conditions at the thermocouple junctions from external influences such as ambient air. The E. M. F. of the thermocouple is not directly fed into the indicating meter but is fractionated with variable potentiometers in a manner as described in my above mentioned application in order to adjust for variations in the catalyst efficiency of the calorimeter.

In one preferred arrangement constructed according to the disclosures herein the temperature increment developed at the catalyst 36 was measured with a Chromel P-constantan thermocouple having 20 hot and 20 cold junctions, this alloy being selected because of its high sensitivity (about 55 to 60 microvolts per degree per junction pair at room temperature). In using such an arrangement it is frequently noticed that certain "floating" E. M. F.'s occurred at the points at which the thermocouple is connected to copper leads to the remainder of the instrument. To avoid this occurrence I welded copper wires to the free ends of the couple and inserted these two joints as additional hot and cold junctions into the calorimeter.

The thermocouples themselves also exhibit small intrinsic E. M. F.'s, which are frequently of the order of a few tenths microvolts and which are usually practically constant in magnitude and size over long periods of time. These E. M. F.'s are eliminated by balancing against an auxiliary externally applied E. M. F. 70 by means of a series of balanced resistances 71 as shown schematically in Figure 3. In my prior apparatus disclosed in Patent No. 2,631,925, issued on March 17, 1953, this stray E. M. F. was compensated for in a similar manner. However, my prior apparatus required a reversal switch interposed between the D. C. source 70 and the potential divider which served to set the proper polarity of the compensating potential. In adjusting for the zero point of the thermocouples it was necessary to set the reversal switch and then manipulate the potential divider to adjust the zero point. However in the event the reversal switch was improperly set for the wrong polarity that fact was not discovered until the potential divider was manipulated. In that event the switch had to be reversed before any balancing could be obtained.

In the present invention, the reversal switch is eliminated and two pairs of balanced resistances 72, 72, 73, 73 are so arranged in relation to the potential divider 74 that when compensation for thermocouple E. M. F. is to be made it is only necessary to adjust the potential divider from its midpoint in either direction.

The D. C. voltage from 70 is reduced by the resistances 72, 72 which preferably are of equal value so that the voltage is reduced to half its value. The relationship of the resistances 73, 73, and 75 is such that 75 has a much smaller value, as for example $\frac{1}{12}$ the value of resistance 73 so that a much greater reduction in voltage is obtained before leading to the potential divider 74. The center tap 78 on resistance 76 functions to reduce the signal input from the thermocouple to the recorder. If desired the full strength of the thermocouple signal may be impressed on the recorder by directly connecting 78 to line 79 as by a switch (not shown).

In the event the gaseous medium does not comprise a sufficient amount of hydrogen or oxygen or does not contain either one of these components to permit complete catalytic combination the lacking component is generated in the electrolytic cell 17 controlled by circuit 18 in a manner similar to that disclosed in my copending application Serial Number 728,676, now Patent No. 2,631,925, issued on March 17, 1953, and is thereafter admixed to the gaseous medium undergoing measurement through dryer 16.

Since the efficiency of highly active and sensitive catalysts as required for the instrument of the invention is apt to change with length of use, e. g. as the result of poisoning, fatigue, etc., the degree of completeness of the catalytic combination of the oxygen with hydrogen or the hydrogen with oxygen might become altered thus interfering with the reliability of such combination as an indication of the oxygen, or hydrogen concentration. The instrument of the present invention also includes therefore, means for calibration and recalibration so that adjustments of the readings can be conveniently made to compensate for fluctuations in catalyst activity. It has been found extremely difficult with my prior instrument to prepare accurate calibration mixtures containing a few ten thousandths or a few thousandths of one percent of oxygen or of hydrogen. In contra-distinction to the direct addition of these constituents from an electrolytic cell as provided for in my prior device I now provide by the instant invention for an indirect procedure as indicated in Figure 1.

When it is desired to calibrate the instrument, the gaseous medium is shifted via the valve 8 into the by-pass catalyst chamber 19, which contains catalyst for the purpose of purifying the gaseous medium or removing all the oxygen therefrom. After the now oxygen-free gas has left the chamber 19 a definite quantity of oxygen generated at the electrolytic cell 40 is added via conduit 26 so that a small amount, e. g. a few hundredths of 1% is present in the gaseous medium. This gas is then passed into the calorimeter through conduit 25, valve 21 and conduit 27 after first passing through a dryer 20. The calorimeter response is noted on the indicating meter and a straight line relationship between percent $O_2$ and meter deflection is noted. After this initial step in order to calibrate for measurements of constituents at less than 0.01% content an indirect method is used whereby faster and more defined readings are obtained. The gaseous medium is now passed by valve 21 through conduit 28 and a small auxiliary catalyst chamber 22 containing calorimeter catalyst in an amount insufficient for complete removal of the added oxygen and then to the calorimeter where a reduced response is noted. The input of oxygen by cell 40 is then increased until the reading obtained after passage through chamber 22 equals that value obtained initially. The amount of oxygen generated in the cell 40 is readily calculated from the input of electric current into the cell by circuit 41. From this known oxygen input and from the oxygen concentration measured by the calorimeter a conversion or purification factor of the catalyst in chamber 22 is calculated, which can be checked by repeating this procedure several times. The purification factor thus determined for a content of about 0.01% $O_2$ is also the same for lower concentrations and it is only necessary, therefore, to adjust the yield of oxygen production in cell 40 as measured by the calorimeter in the gas leaving 22 by reducing the calibrating current fed by circuit 41 to cell 40 so that calculated values of only a few thousandths of one per cent enter the calorimeter. In this manner the meter can be calibrated so that, for example, when measuring the oxygen content each scale division equals 8 ma. calibrating current for a purification factor in chamber 22 of 1/8, and periodically when the meter is recalibrated, with 8 ma. the deflection of the meter is noted and any loss in catalyst sensitivity is corrected for by adjusting the deflection to one division.

The instrument may also be used for the determination of carbon monoxide or of carbon dioxide in hydrogen or in inert gaseous mixtures containing free hydrogen. Such a determination would be based on the reactions:

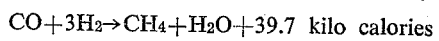

or

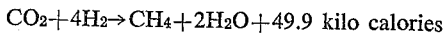

The apparatus would be used as described previously except that the calorimeter 13 containing the catalyst which initiates the reaction would be operated at an elevated temperature in the neighborhood of 250° C., and the catalyst employed would be adapted for the reactions set forth above. In this case the electrolytic cell of the instrument could only be used to supply the hydrogen for the reaction, if necessary, but not for calibration. In such event the instrument would be calibrated by using separately blended gas mixtures containing known amounts of carbon monoxide. This may, for example, be brought about by adding to the test gas, from which carbon monoxide has been removed catalytically, known quantities of carbon monoxide, meter with a calibrated flow meter such as a differential pressure capillary meter. However, the method of indirect calibration as described above for the measurements of small amounts of oxygen or hydrogen may likewise be employed in the calibration for carbon monoxide or carbon dioxide.

This instrument, with only slight modification can also be employed for determining several constituents in a gaseous medium practically simultaneously by merely adding a second calorimeter in series with the calorimeter 13 of Fig. 1. Thus, for each constituent to be measured a special catalyst would be used at the appropriate temperature. For example, if a gaseous medium consisting mainly of hydrogen with trace amounts of oxygen, carbon monoxide and carbon dioxide is to be measured, the gas would first be passed through a calorimeter 13 containing a catalyst capable of enabling the determination of oxygen content. Such a catalyst might be, for instance, carrier-based palladium operated at a temperature of about 125° in order to overcome the inhibiting influence of carbon monoxide on the reaction between oxygen and hydrogen, there being no change, chemically speaking, in the carbon monoxide and carbon dioxide content under these conditions. The gaseous medium, now oxygen free, is then passed through a second calorimeter 113 similar to calorimeter 13 operated at a higher temperature and containing a catalyst which would promote the hydrogenation of carbon monoxide and carbon dioxide to methane, whereby the combined concentration of carbon monoxide plus carbon dioxide is obtained. The carbon dioxide is then removed by passage over solid potassium hydroxide and the residual gas, now both oxygen and carbon dioxide free is then passed through the second calorimeter to obtain the carbon monoxide concentration, the carbon dioxide content being found by taking the difference between the two values thus obtained. To assure accuracy of reading the residual gas is alternately passed through the second calorimeter both before and after removal of the carbon dioxide content. Other multiple constituent gases can be handled in a similar manner.

The present invention thus provides a simple and highly efficient device for the determination and measurement of extremely minute constituents of a gaseous medium and specifically that of determining the amount of oxygen or hydrogen present. That device further insures accurate calibration and re-calibration and provides for the addition, when required of additional oxygen or hydrogen into the gas. Then instrument is independent of values of heat conductivity and is operable whether or not oxygen and the principal constituent of the gaseous medium have the same or a different coefficient of thermal conductivity.

While I have described the instrument with particular reference to the detection and measurement of the oxygen content of gaseous media it is equally applicable to detecting the hydrogen content and other constituents in small trace amounts which can be reduced in a calorimeter following a known reaction. It is, of course, understood that the scope of the invention is not to be limited to the particular details shown or described but is to include all changes and modification of the examples of the invention herein chosen for purposes of the disclosure, which do not constitute departures from the spirit and scope of the invention.

I claim:

1. A measuring apparatus for the continuous detection and assay of gaseous media containing low concentrations of contaminants in the range of 0.0001% to 0.001%, wherein a gas train conducts the gaseous medium through a purifier chamber and a dryer chamber and thence to a catalyst reaction chamber containing thermal responsive temperature measuring means to measure the temperature increment due to the heat developed by the reaction in said reaction chamber, and comprising a thermopile having at least a first and a second terminal lead, an indicating recorder having at least a first and a second terminal lead, said thermal responsive temperature measuring means exhibiting the characteristic of generating a small E. M. F., and including therewith back E. M. F. compensating means to supply a compensating D. C. potential of proper polarity thereto and establish a zero point of the apparatus, said compensating means comprising a first pair of series resistances adapted to be connected across a source of D. C. potential, a variable potential divider having its resistor element in parallel with said first pair of resistances and adapted to be connected across a source of D. C. potential, a sliding contact wire electrically associated with said resistor element and being interconnected to a point between the first pair of resistance, the pairs of terminal leads of said thermopile and said recorder being interconnectable with the sliding contact wire.

2. The gas measuring apparatus of claim 1 wherein the sliding contact wire includes in series therewith a second pair of series resistances having a resistance element interposed therebetween, the pairs of terminal leads of said thermopile and said recorder being connected in parallel with the resistance element.

3. The gas measuring apparatus of claim 2, wherein terminal leads of said thermopile have a third pair of series resistances connected therebetween, one of said recorder terminal leads being connected to one of said thermopile terminal leads and said other recorder terminal being connected to a sliding contact associated with one resistance of said third pair of resistances.

4. A measuring apparatus for the continuous detection and assay of gaseous media containing low concentrations of contaminants in the range of 0.0001 to 0.001%, comprising in combination first conduit means leading to a purifier chamber and second conduit means leading therefrom and connecting in series a first dryer, a calorimeter reaction chamber, and a second dryer chamber, respectively, a first electrolytic cell being connected to said first conduit means prior to said purifier, valve means in said second conduit means between said purifier and said first dryer, a by-pass conduit means leading from said valve back to said second conduit means at a location forwardly of said valve, a second electrolytic cell connected in said by-pass conduit.

5. A measuring apparatus according to claim 4, comprising an auxiliary catalyst chamber in said by-pass conduit between said valve and a said second electrolytic cell.

References Cited in the file of this patent
UNITED STATES PATENTS

| 2,037,409 | Duvander | Apr. 14, 1936 |
| 2,631,925 | Cohn | Mar. 17, 1953 |

OTHER REFERENCES

Larson et al.: "J. Am. Chem. Soc.," vol. 44, pages 20–25 (1922).

Lamb et al.: "J. Am. Chem. Soc.," vol. 47, January 1925, pages 123–142.

Daynee: "Gas Analysis of Measurement of Thermal Conductivity," Cambridge in The University Press, pages 142–143.